US012270772B2

United States Patent
Archambault (10) Patent No.: US 12,270,772 B2
(45) Date of Patent: Apr. 8, 2025

(54) MATERIAL DETECTION IN X-RAY SECURITY SCREENING

(71) Applicant: Rapiscan Holdings, Inc., Hawthorne, CA (US)

(72) Inventor: Simon Archambault, St-Laurent (CA)

(73) Assignee: Rapiscan Holdings, Inc., Hawthorne, CA (US)

( * ) Notice: Subject to any disclaimer, the term of this patent is extended or adjusted under 35 U.S.C. 154(b) by 0 days.

(21) Appl. No.: 18/667,352

(22) Filed: May 17, 2024

(65) Prior Publication Data

US 2024/0302300 A1    Sep. 12, 2024

Related U.S. Application Data

(63) Continuation of application No. 17/378,037, filed on Jul. 16, 2021, now Pat. No. 12,019,035.

(51) Int. Cl.
*G01N 23/18*    (2018.01)
*G01N 23/04*    (2018.01)
(Continued)

(52) U.S. Cl.
CPC ............. *G01N 23/18* (2013.01); *G01N 23/04* (2013.01); *G01N 23/083* (2013.01); *G01N 23/10* (2013.01);
(Continued)

(58) Field of Classification Search
CPC ...... G01N 23/18; G01N 23/04; G01N 23/083; G01N 23/10; G01N 2223/04;
(Continued)

(56) References Cited

U.S. PATENT DOCUMENTS 4,020,346 A    4/1977 Dennis
4,349,739 A    9/1982 Annis
(Continued)

FOREIGN PATENT DOCUMENTS

CA    1301371    5/1992
CA    2163884    12/1994
(Continued)

OTHER PUBLICATIONS

International Search Report for International Application No. PCT/CA2019/051489, dated Dec. 30, 2019, (p. 4).
(Continued)

*Primary Examiner* — Michael S Osinski
(74) *Attorney, Agent, or Firm* — Novel IP (57) ABSTRACT

A method for detecting the maximum potential presence of a material in an object. The method includes obtaining raw x-ray image data comprising a plurality of pixels for the object from an X-ray scanning device, wherein each pixel of the plurality of pixels has associated therewith an attenuation value and an effective atomic number ($Z_{eff}$) for the pixel. The method further includes converting, for each pixel having a $Z_{eff}$ value greater than a threshold effective atomic number ($Z_{eff\text{-}threshold}$), the $Z_{eff}$ at the pixel to the $Z_{eff\text{-}threshold}$ while applying a correction factor to the attenuation value for the pixel to bring the attenuation value into correspondence with the conversion of the $Z_{eff}$ value for the pixel and determining a maximum potential amount of the material present at each pixel based on the corrected attenuation value at the pixel. This renders material more apparent in visual display.

20 Claims, 4 Drawing Sheets

(51) Int. Cl.
   *G01N 23/083* (2018.01)
   *G01N 23/10* (2018.01)
   *G06T 5/00* (2024.01)

(52) U.S. Cl.
   CPC ............ *G06T 5/00* (2013.01); *G01N 2223/04* (2013.01); *G01N 2223/3308* (2013.01); *G01N 2223/401* (2013.01); *G01N 2223/643* (2013.01); *G01N 2223/652* (2013.01); *G06T 2207/10116* (2013.01)

(58) Field of Classification Search
   CPC ..... G01N 2223/3308; G01N 2223/401; G01N 2223/643; G01N 2223/652; G01N 23/087; G01N 23/046; G01N 2223/1016; G01N 2223/419; G01N 2223/618; G01N 2223/423; G06T 5/001; G06T 2207/10116; G06T 7/0004; G06T 2207/30112; G06V 20/52
   See application file for complete search history.

(56) References Cited

U.S. PATENT DOCUMENTS

| | | | |
|---|---|---|---|
| 4,482,957 A | 11/1984 | Bjorkholm |
| 4,618,978 A | 10/1986 | Cosman |
| 4,872,188 A | 10/1989 | Lauro |
| 5,022,062 A | 6/1991 | Annis |
| 5,044,002 A | 8/1991 | Stein |
| 5,164,590 A | 11/1992 | Coles |
| 5,179,581 A | 1/1993 | Annis |
| 5,224,144 A | 6/1993 | Annis |
| 5,253,283 A | 10/1993 | Annis |
| 5,528,656 A | 6/1996 | Annis |
| 5,532,492 A | 7/1996 | He |
| 5,541,856 A | 7/1996 | Hammermeister |
| 5,600,700 A | 2/1997 | Krug |
| 5,696,806 A | 12/1997 | Grodzins |
| 5,768,334 A | 6/1998 | Maitrejean |
| 5,838,758 A | 11/1998 | Krug |
| 5,872,829 A | 2/1999 | Wischmann |
| 5,930,326 A | 7/1999 | Rothschild |
| 5,974,111 A | 10/1999 | Krug |
| 6,005,912 A | 12/1999 | Ocleppo |
| 6,018,562 A | 1/2000 | Willson |
| 6,058,159 A | 5/2000 | Conway |
| 6,081,580 A | 6/2000 | Grodzins |
| 6,094,472 A | 7/2000 | Smith |
| 6,192,101 B1 | 2/2001 | Grodzins |
| 6,218,943 B1 | 4/2001 | Ellenbogen |
| 6,304,629 B1 | 10/2001 | Conway |
| 6,379,043 B1 | 4/2002 | Zylka |
| 6,434,219 B1 | 8/2002 | Rothschild |
| 6,453,003 B1 | 9/2002 | Springer |
| 6,453,007 B2 | 9/2002 | Adams |
| 6,456,072 B1 | 9/2002 | Webb |
| 6,459,761 B1 | 10/2002 | Grodzins |
| RE37,899 E | 11/2002 | Grodzins |
| 6,490,477 B1 | 12/2002 | Zylka |
| 6,590,956 B2 | 7/2003 | Fenkart |
| 6,843,599 B2 | 1/2005 | Le |
| 6,895,072 B2 | 5/2005 | Schrock |
| 6,928,137 B2 | 8/2005 | Bruder |
| 6,993,111 B1 | 1/2006 | Annis |
| 7,010,094 B2 | 3/2006 | Grodzins |
| 7,020,241 B2 | 3/2006 | Beneke |
| 7,049,814 B2 | 5/2006 | Mann |
| 7,062,011 B1 | 6/2006 | Tybinkowski |
| 7,132,637 B2 | 11/2006 | Nygard |
| 7,139,406 B2 | 11/2006 | McClelland |
| 7,158,611 B2 | 1/2007 | Heismann |
| 7,162,005 B2 | 1/2007 | Bjorkholm |
| 7,164,750 B2 | 1/2007 | Nabors |
| 7,221,732 B1 | 5/2007 | Annis |
| 7,319,737 B2 | 1/2008 | Singh |
| 7,322,745 B2 | 1/2008 | Agrawal |
| 7,339,159 B2 | 3/2008 | Juh |
| 7,366,282 B2 | 4/2008 | Peschmann |
| 7,384,194 B2 | 6/2008 | Gatten |
| 7,417,440 B2 | 8/2008 | Peschmann |
| 7,440,543 B2 | 10/2008 | Morton |
| 7,453,987 B1 | 11/2008 | Richardson |
| 7,486,768 B2 | 2/2009 | Allman |
| 7,486,772 B2 | 2/2009 | Lu |
| 7,538,325 B2 | 5/2009 | Mishin |
| 7,551,718 B2 | 6/2009 | Rothschild |
| 7,555,099 B2 | 6/2009 | Rothschild |
| 7,579,845 B2 | 8/2009 | Peschmann |
| 7,606,348 B2 | 10/2009 | Foland |
| 7,634,051 B2 | 12/2009 | Robinson |
| 7,636,418 B2 | 12/2009 | Anwar |
| 7,656,995 B2 | 2/2010 | Robinson |
| 7,664,230 B2 | 2/2010 | Morton |
| 7,668,289 B2 | 2/2010 | Proksa |
| 7,672,427 B2 | 3/2010 | Chen |
| 7,693,261 B2 | 4/2010 | Robinson |
| 7,706,507 B2 | 4/2010 | Williamson |
| 7,720,195 B2 | 5/2010 | Allman |
| 7,724,868 B2 | 5/2010 | Morton |
| 7,734,066 B2 | 6/2010 | DeLia |
| 7,831,012 B2 | 11/2010 | Foland |
| 7,856,081 B2 | 12/2010 | Peschmann |
| 7,873,201 B2 | 1/2011 | Eilbert |
| 7,876,879 B2 | 1/2011 | Morton |
| 7,924,979 B2 | 4/2011 | Rothschild |
| 7,929,663 B2 | 4/2011 | Morton |
| 7,945,017 B2 | 5/2011 | Chen |
| 7,949,101 B2 | 5/2011 | Morton |
| 7,965,816 B2 | 6/2011 | Kravis |
| 7,995,705 B2 | 8/2011 | Allman |
| 7,995,707 B2 | 8/2011 | Rothschild |
| 8,009,799 B2 | 8/2011 | Doyle |
| 8,009,800 B2 | 8/2011 | Doyle |
| 8,014,493 B2 | 9/2011 | Roux |
| 8,031,903 B2 | 10/2011 | Paresi |
| 8,098,794 B1 | 1/2012 | Fernandez |
| 8,116,428 B2 | 2/2012 | Gudmundson |
| 8,135,110 B2 | 3/2012 | Morton |
| 8,138,770 B2 | 3/2012 | Peschmann |
| D658,294 S | 4/2012 | Awad |
| 8,189,889 B2 | 5/2012 | Pearlstein |
| 8,204,173 B2 | 6/2012 | Betcke |
| 8,223,919 B2 | 7/2012 | Morton |
| 8,233,588 B2 | 7/2012 | Gibson |
| 8,243,876 B2 | 8/2012 | Morton |
| 8,284,896 B2 | 10/2012 | Singh |
| 8,311,309 B2 | 11/2012 | Siedenburg |
| 8,320,523 B2 | 11/2012 | Zhang |
| 8,331,535 B2 | 12/2012 | Morton |
| 8,385,501 B2 | 2/2013 | Allman |
| 8,401,270 B2 | 3/2013 | Eilbert |
| 8,428,217 B2 | 4/2013 | Peschmann |
| 8,451,974 B2 | 5/2013 | Morton |
| 8,478,016 B2 | 7/2013 | Robinson |
| 8,503,605 B2 | 8/2013 | Morton |
| 8,513,617 B2 | 8/2013 | Iwanczyk |
| 8,515,010 B1 | 8/2013 | Hurd |
| 8,537,968 B2 | 9/2013 | Radley |
| 8,552,722 B2 | 10/2013 | Lionheart |
| 8,559,592 B2 | 10/2013 | Betcke |
| 8,625,735 B2 | 1/2014 | Morton |
| 8,633,823 B2 | 1/2014 | Armistead, Jr. |
| 8,654,922 B2 | 2/2014 | Bendahan |
| 8,674,706 B2 | 3/2014 | Peschmann |
| 8,724,774 B2 | 5/2014 | Langeveld |
| 8,774,357 B2 | 7/2014 | Morton |
| 8,781,066 B2 | 7/2014 | Gudmundson |
| 8,804,899 B2 | 8/2014 | Morton |
| 8,831,331 B2 | 9/2014 | Gudmundson |
| 8,842,808 B2 | 9/2014 | Rothschild |
| 8,867,816 B2 | 10/2014 | Bouchard |
| 8,879,791 B2 | 11/2014 | Drouin |
| 8,885,794 B2 | 11/2014 | Morton |
| 8,903,046 B2 | 12/2014 | Morton |

(56) References Cited

U.S. PATENT DOCUMENTS

| | | |
|---|---|---|
| 8,908,831 B2 | 12/2014 | Bendahan |
| 8,929,509 B2 | 1/2015 | Morton |
| 8,958,526 B2 | 2/2015 | Morton |
| 8,971,485 B2 | 3/2015 | Morton |
| 9,020,095 B2 | 4/2015 | Morton |
| 9,020,096 B2 | 4/2015 | Allman |
| 9,036,779 B2 | 5/2015 | Morton |
| 9,042,511 B2 | 5/2015 | Peschmann |
| 9,048,061 B2 | 6/2015 | Morton |
| 9,111,331 B2 | 8/2015 | Parikh |
| 9,113,839 B2 | 8/2015 | Morton |
| 9,158,030 B2 | 10/2015 | Morton |
| 9,170,212 B2 | 10/2015 | Bouchard |
| 9,183,647 B2 | 11/2015 | Morton |
| 9,189,846 B2 | 11/2015 | Wismüller |
| 9,194,975 B2 | 11/2015 | Drouin |
| 9,196,082 B2 | 11/2015 | Pearlstein |
| 9,223,051 B2 | 12/2015 | Bendahan |
| 9,268,058 B2 | 2/2016 | Peschmann |
| 9,285,488 B2 | 3/2016 | Arodzero |
| 9,311,277 B2 | 4/2016 | Rinkel |
| 9,404,875 B2 | 8/2016 | Langeveld |
| 9,435,752 B2 | 9/2016 | Morton |
| 9,442,082 B2 | 9/2016 | Morton |
| 9,562,866 B2 | 2/2017 | Morton |
| 9,576,766 B2 | 2/2017 | Morton |
| 9,606,259 B2 | 3/2017 | Morton |
| 9,618,648 B2 | 4/2017 | Morton |
| 9,632,205 B2 | 4/2017 | Morton |
| 9,632,206 B2 | 4/2017 | Parikh |
| 9,638,646 B2 | 5/2017 | Morton |
| 9,658,343 B2 | 5/2017 | Arodzero |
| 9,681,851 B2 | 6/2017 | Rohler |
| 9,714,920 B2 | 7/2017 | Lionheart |
| 9,733,385 B2 | 8/2017 | Franco |
| 9,746,431 B2 | 8/2017 | Grader |
| 9,747,705 B2 | 8/2017 | Morton |
| 9,772,426 B2 | 9/2017 | Armistead, Jr. |
| 9,823,383 B2 | 11/2017 | Hanley |
| 9,835,756 B2 | 12/2017 | Morton |
| 9,915,752 B2 | 3/2018 | Peschmann |
| 9,958,569 B2 | 5/2018 | Morton |
| 9,989,508 B2 | 6/2018 | Awad |
| 10,089,956 B2 | 10/2018 | Awad |
| 10,107,783 B2 | 10/2018 | Lionheart |
| 10,156,642 B2 | 12/2018 | Morton |
| 10,175,381 B2 | 1/2019 | Morton |
| 10,180,483 B2 | 1/2019 | Holdsworth |
| 10,209,372 B2 | 2/2019 | Arodzero |
| 10,254,436 B2 | 4/2019 | Awad |
| 10,295,483 B2 | 5/2019 | Morton |
| 10,302,807 B2 | 5/2019 | Yu |
| 10,353,109 B2 | 7/2019 | Hanley |
| 10,386,532 B2 | 8/2019 | Morton |
| 10,408,967 B2 | 9/2019 | Morton |
| 10,422,919 B2 | 9/2019 | Parikh |
| 10,509,142 B2 | 12/2019 | Parikh |
| 10,510,319 B2 | 12/2019 | Awad |
| 10,555,716 B2 | 2/2020 | Rohler |
| 10,557,911 B2 | 2/2020 | Holdsworth |
| 10,578,752 B2 | 3/2020 | Morton |
| 10,591,424 B2 | 3/2020 | Morton |
| 10,598,812 B2 | 3/2020 | Franco |
| 10,650,783 B2 | 5/2020 | Awad |
| 10,670,740 B2 | 6/2020 | Couture |
| 10,754,057 B2 | 8/2020 | Bendahan |
| 10,768,338 B2 | 9/2020 | Yu |
| 10,782,440 B2 | 9/2020 | Hanley |
| 10,795,047 B2 | 10/2020 | St-Aubin |
| 10,795,048 B2 | 10/2020 | St-Aubin |
| 10,795,049 B2 | 10/2020 | St-Aubin |
| 10,809,414 B2 | 10/2020 | St-Aubin |
| 10,830,911 B2 | 11/2020 | Couture |
| 10,830,920 B2 | 11/2020 | Parikh |
| 10,901,112 B2 | 1/2021 | Morton |
| 10,901,114 B2 | 1/2021 | St-Aubin |
| 10,942,291 B2 | 3/2021 | Morton |
| 10,955,367 B2 | 3/2021 | Couture |
| 10,976,271 B2 | 4/2021 | Morton |
| 10,976,465 B2 | 4/2021 | Morton |
| 11,073,486 B2 | 7/2021 | Siegrist |
| 11,099,294 B2 | 8/2021 | Parikh |
| 11,116,471 B2 | 9/2021 | Rohler |
| 11,143,783 B2 | 10/2021 | Morton |
| 11,175,245 B1 | 11/2021 | Rommel |
| 11,287,391 B2 | 3/2022 | Yu |
| 11,307,325 B2 | 4/2022 | Morton |
| 11,397,276 B2 | 7/2022 | Bendahan |
| 11,430,109 B2 | 8/2022 | Cochran |
| 11,478,214 B2 | 10/2022 | Siewerdsen |
| 11,525,930 B2 | 12/2022 | Couture |
| 11,536,672 B2 | 12/2022 | Couture |
| 11,579,327 B2 | 2/2023 | Couture |
| 11,822,041 B2 | 11/2023 | Morton |
| 2001/0014137 A1 | 8/2001 | Bjorkholm |
| 2002/0031202 A1 | 3/2002 | Callerame |
| 2002/0094059 A1 | 7/2002 | Grodzins |
| 2003/0085348 A1 | 5/2003 | Megerle |
| 2004/0091078 A1 | 5/2004 | Ambrefe |
| 2004/0179643 A1 | 9/2004 | Gregerson |
| 2005/0008126 A1 | 1/2005 | Juh |
| 2005/0025280 A1 | 2/2005 | Schulte |
| 2005/0058242 A1 | 3/2005 | Peschmann |
| 2005/0117683 A1 | 6/2005 | Mishin |
| 2005/0117700 A1 | 6/2005 | Peschmann |
| 2006/0098866 A1 | 5/2006 | Whitson |
| 2006/0251211 A1 | 11/2006 | Grodzins |
| 2007/0003009 A1 | 1/2007 | Gray |
| 2007/0116177 A1 | 5/2007 | Chen |
| 2007/0132580 A1 | 6/2007 | Ambrefe, Jr. |
| 2007/0133742 A1 | 6/2007 | Gatten |
| 2007/0172129 A1 | 7/2007 | Tortora |
| 2007/0235652 A1 | 10/2007 | Smith |
| 2007/0280502 A1 | 12/2007 | Paresi |
| 2008/0025470 A1 | 1/2008 | Streyl |
| 2008/0063140 A1 | 3/2008 | Awad |
| 2008/0211431 A1 | 9/2008 | Mishin |
| 2008/0232668 A1 | 9/2008 | Kitamura |
| 2009/0010386 A1 | 1/2009 | Peschmann |
| 2009/0060135 A1 | 3/2009 | Morton |
| 2009/0196396 A1 | 8/2009 | Doyle |
| 2009/0285353 A1 | 11/2009 | Ellenbogen |
| 2010/0002834 A1 | 1/2010 | Gudmundson |
| 2010/0027741 A1 | 2/2010 | Doyle |
| 2010/0086185 A1 | 4/2010 | Weiss |
| 2010/0098218 A1 | 4/2010 | Vermilyea |
| 2010/0172476 A1 | 7/2010 | Morton |
| 2010/0207741 A1 | 8/2010 | Gudmundson |
| 2010/0208972 A1 | 8/2010 | Bouchard |
| 2010/0223016 A1 | 9/2010 | Gibson |
| 2010/0277312 A1 | 11/2010 | Edic |
| 2010/0295689 A1 | 11/2010 | Armistead, Jr. |
| 2010/0302034 A1 | 12/2010 | Clements |
| 2011/0007870 A1 | 1/2011 | Roux |
| 2011/0019797 A1 | 1/2011 | Morton |
| 2011/0033118 A1 | 2/2011 | Yildiz |
| 2011/0172972 A1 | 7/2011 | Gudmundson |
| 2011/0228896 A1 | 9/2011 | Peschmann |
| 2011/0235777 A1 | 9/2011 | Gozani |
| 2012/0069964 A1 | 3/2012 | Scholling |
| 2012/0093367 A1 | 4/2012 | Gudmundson |
| 2012/0140879 A1 | 6/2012 | Gudmundson |
| 2012/0230463 A1 | 9/2012 | Morton |
| 2012/0275646 A1 | 11/2012 | Drouin |
| 2013/0034268 A1 | 2/2013 | Perron |
| 2013/0085788 A1 | 4/2013 | Rowlan |
| 2013/0114788 A1 | 5/2013 | Crass |
| 2013/0163811 A1 | 6/2013 | Oelke |
| 2013/0251098 A1 | 9/2013 | Morton |
| 2013/0292574 A1 | 11/2013 | Levene |
| 2013/0294574 A1 | 11/2013 | Peschmann |
| 2013/0301794 A1 | 11/2013 | Grader |
| 2013/0336447 A1 | 12/2013 | Morton |
| 2014/0072108 A1 | 3/2014 | Rohler |

(56) References Cited

U.S. PATENT DOCUMENTS

| | | |
|---|---|---|
| 2014/0185755 A1 | 7/2014 | Bendahan |
| 2014/0185923 A1 | 7/2014 | Chen |
| 2014/0205059 A1 | 7/2014 | Sharpless |
| 2014/0211917 A1 | 7/2014 | Chen |
| 2014/0211980 A1 | 7/2014 | Bouchard |
| 2014/0222385 A1 | 8/2014 | Muenster |
| 2014/0241495 A1 | 8/2014 | Gudmundson |
| 2014/0249536 A1 | 9/2014 | Jajeh |
| 2015/0021342 A1 | 1/2015 | Crass |
| 2015/0186732 A1 | 7/2015 | Perron |
| 2015/0268016 A1 | 9/2015 | Eshetu |
| 2015/0282781 A1 | 10/2015 | Rohler |
| 2015/0355117 A1 | 12/2015 | Morton |
| 2016/0025888 A1 | 1/2016 | Peschmann |
| 2016/0033674 A1 | 2/2016 | Allman |
| 2016/0084984 A1* | 3/2016 | Franco .................. G01N 23/04 378/57 |
| 2016/0223706 A1 | 8/2016 | Franco |
| 2016/0252647 A1 | 9/2016 | Awad |
| 2016/0260412 A1 | 9/2016 | Awad |
| 2017/0103513 A1 | 4/2017 | Heilmann |
| 2017/0184737 A1 | 6/2017 | Dujmic |
| 2017/0184756 A1 | 6/2017 | Miao |
| 2017/0236232 A1 | 8/2017 | Morton |
| 2017/0242148 A1 | 8/2017 | Yu |
| 2017/0299526 A1 | 10/2017 | Morton |
| 2017/0309043 A1 | 10/2017 | Li |
| 2017/0319169 A1 | 11/2017 | Rohler |
| 2017/0328844 A1 | 11/2017 | Li |
| 2017/0371010 A1 | 12/2017 | Shanbhag |
| 2018/0038988 A1 | 2/2018 | Morton |
| 2018/0106733 A1 | 4/2018 | Li |
| 2018/0162584 A1 | 6/2018 | Tauber |
| 2019/0003989 A1 | 1/2019 | Miyazaki |
| 2019/0219729 A1 | 7/2019 | St-Aubin |
| 2019/0346379 A1 | 11/2019 | Awad |
| 2019/0346381 A1 | 11/2019 | Awad |
| 2020/0085404 A1 | 3/2020 | Siewerdsen |
| 2020/0103357 A1 | 4/2020 | Morton |
| 2020/0103548 A1 | 4/2020 | Yu |
| 2020/0110043 A1 | 4/2020 | Marín |
| 2020/0146648 A1 | 5/2020 | Rohler |
| 2020/0158909 A1 | 5/2020 | Morton |
| 2020/0200690 A1 | 6/2020 | Morton |
| 2020/0211186 A1 | 7/2020 | Gong |
| 2020/0249179 A1 | 8/2020 | Yamakawa |
| 2020/0348247 A1 | 11/2020 | Bur |
| 2020/0355631 A1 | 11/2020 | Yu |
| 2020/0378906 A1 | 12/2020 | Morton |
| 2021/0004994 A1 | 1/2021 | Kubo |
| 2021/0102907 A1 | 4/2021 | Couture |
| 2021/0361254 A1 | 11/2021 | Rohler |
| 2021/0381991 A1 | 12/2021 | Desjeans-Gauthier |
| 2021/0405243 A1 | 12/2021 | Parikh |
| 2022/0291148 A1 | 9/2022 | Gill |
| 2023/0000459 A1 | 1/2023 | St-Aubin |
| 2023/0147681 A1 | 5/2023 | Dinca |
| 2023/0152475 A1 | 5/2023 | Couture |
| 2023/0175984 A1 | 6/2023 | Yoshida |
| 2023/0245847 A1 | 8/2023 | Procter |
| 2024/0003834 A1 | 1/2024 | Procter |

FOREIGN PATENT DOCUMENTS

| | | |
|---|---|---|
| CA | 2574402 A1 | 1/2006 |
| CA | 2744690 | 6/2009 |
| CA | 2692662 | 3/2010 |
| CA | 2697525 | 3/2010 |
| CA | 2709468 | 3/2010 |
| CA | 2690163 | 8/2011 |
| CA | 2869201 | 10/2013 |
| CN | 102175698 | 9/2011 |
| CN | 103327901 | 9/2013 |
| CN | 104165896 | 11/2014 |
| CN | 108937992 A | 12/2018 |
| CN | 114767137 A | 7/2022 |
| CN | 116359257 A | 6/2023 |
| FR | 3037401 | 12/2016 |
| JP | 3946612 | 7/2007 |
| WO | 9423458 | 10/1994 |
| WO | 2006137919 | 12/2006 |
| WO | 2008133765 | 11/2008 |
| WO | 2008139167 A2 | 11/2008 |
| WO | 2008157843 | 12/2008 |
| WO | 2009114928 | 9/2009 |
| WO | 2010025538 A1 | 3/2010 |
| WO | 2013149788 | 10/2013 |
| WO | 2018121444 | 7/2018 |

OTHER PUBLICATIONS

International Search Report and Written Opinion for International Application No. PCT/CA2020/051239, dated Dec. 16, 2020, (17 pages).

K. Wells; D.A. Bradley;, "A review of X-ray explosives detection techniques for checked baggage", Applied Radiation and Isotopes., Elsevier, Oxford., GB, GB, (Jan. 12, 2012), vol. 70, No. 8, doi:10.1016/j.apradiso.2012.01.011, ISSN 0969-8043, pp. 1729-1746, XP028401820.

Richard D. R. Macdonald, "<title>Design and implementation of a dual-energy x-ray imaging system for organic material detection in an airport security application</title>", Proceedings of SPIE, SPIE, (Apr. 4, 2001), vol. 4301, doi:10.1117/12.420922, ISSN 0277786X, pp. 31-41, XP055104503.

International Search Report for corresponding International Patent Application No. PCT/CA2014/050981 dated Jan. 5, 2015, 6 pgs.

International Search Report for corresponding International Patent Application No. PCT/CA2014/051074 dated Jan. 20, 2015.

International Search Report and Written Opinion for International Application No. PCT/CA2019/050617, dated Jul. 30, 2019, (11 pages).

International Search Report & Written Opinion for PCT/CA2019/050616, dated Jul. 5, 2019, (15 pages).

International Search Report for International Application No. PCT/CA2013/050744, dated Jun. 10, 2014, (5 pages).

International Search Report and Written for International Application No. PCT/CA2018/051673, dated Mar. 14, 2019, (8-pages).

International Search Report and Written Opinion for International Application No. PCT/CA2018/051674, dated Mar. 29, 2019, (8 pages).

International Search Report and Written Opinion for International Application No. PCT/CA2018/051675, dated Mar. 21, 2019, (11 pages).

International Search Report and Written Opinion for International Application No. PCT/CA2018/051676, dated Mar. 26, 2019, (7 pages).

Hurd et al.(U.S. Pat. No. 8,515,010, hereafter referred to as Hurd), Ying et al.("Dual Energy Volumetric X-ray Tomographic Sensor for Luggage Screening", IEEE, SAS Feb. 2007) (Year: 2007).

International Search Report and Written Opinion for International Application No. PCT/CA2018/051677, dated Mar. 29, 2019, (8 pages).

Lehmann et al., Generalized image combinations in dual KVP digital radiography, Medical Physics, Sep. 1981, 659-667, 8-5, American Association of Physicists in Medicine.

Bond et al., ZeCalc Algorithm Details, Lawrence Livermore National Laboratory, Jan. 7, 2013, Livermore U.S.A.

Hassanpour et al (NPL "Illicit Material Detection using Dual-Energy X-ray Images", The International Arab Journal of Information Technology, vol. 13, No. 4, Jul. 2016, p. 8) (Year: 2016).

* cited by examiner

MATERIAL DETECTION IN X-RAY SECURITY SCREENING

CROSS-REFERENCE

The present application is a continuation application of U.S. patent application Ser. No. 17/378,037, titled "Material Detection in X-Ray Security Screening" and filed on Jul. 16, 2021, which is herein incorporated by reference in its entirety.

TECHNICAL FIELD

The present disclosure generally relates to a system and method for material detection in x-ray security screening. More particularly, the present disclosure relates to a system and method for detecting the presence of organic materials, such as explosives, in x-ray security screening.

BACKGROUND

X-ray inspection systems are used for detecting threats (e.g., explosives, drugs or other potentially dangerous materials) in cargo, baggage and parcels in airports, ports and other check-points. The images produced by the X-ray machines are used to detect potential threats either visually by operator analysis, or automatically using software algorithms. However, cargo and baggage are often cluttered and layered with various objects. In the resultant X-ray images, it may be difficult for a human operator reviewing the information produced by an x-ray scanning operation to distinguish an organic material from other overlaying or underlaying inorganic materials like metals. Many objects and materials of interest are organic in nature. Some examples may include explosive materials. In other instances, the material of interest in x-ray screening images may be metals, such as Aluminum. Therefore, providing information to human operators which makes the presence of a material of interest more apparent in cluttered bags is still a challenge.

X-ray systems with image processing functionalities like inorganic stripping (organic only) mode and effective atomic number-based coloration have been developed to help address this problem. However, these methods only show the organic material that is present and reliably detected and accordingly is not necessarily very apparent to a human operator reviewing the information. For example, a very thin layer of organic material may be very difficult to distinguish without further processing to enhance coloration. Explosive detection algorithms have also been created to enhance automated detection of explosives and other threats. Other solutions include using computed tomography (CT) scanners for detection of explosives. However, these tend to be more expensive as compared to X-ray scanners.

It is therefore desired to have an X-ray screening system that allows an operator to visually see if an image region contains a material of interest and therefore a potential threat.

SUMMARY

The present disclosure generally relates to a system and method for material detection in x-ray security screening. More particularly, the present disclosure relates to a system and method for detecting the presence of organic materials, such as explosives, in an x-ray security screening.

In one aspect, there is provided a method for detecting the presence of a material in an object. The method includes obtaining raw x-ray image data for the object from an X-ray scanning device, the raw x-ray image data comprising a plurality of pixels, wherein each pixel of the plurality of pixels has associated therewith an attenuation value and an effective atomic number ($Z_{eff}$) value, and converting, for each pixel having a $Z_{eff}$ value greater than a threshold effective atomic number ($Z_{eff\text{-}threshold}$), the $Z_{eff}$ at the pixel to the $Z_{eff\text{-}threshold}$ while applying a correction factor to the attenuation value for the pixel to bring the attenuation value into correspondence with the conversion of the $Z_{eff}$ value for the pixel. The method further includes determining a maximum potential amount of material present at each pixel based on the corrected attenuation value at the pixel.

The method may further include the step of generating an image showing the maximum potential amount of the material that is present at each pixel of the image. In a further aspect, the image may be visually displayed to a human operator. This information makes the presence of the material more apparent and therefore makes it easier to identify potential threats.

In one aspect, the method includes the step of determining the $Z_{eff\text{-}threshold}$ value based on an effective atomic number of a calibration material. In a further aspect, the material to be detected is an organic material and the calibration material is plexiglass. In another aspect, the material to be detected is an inorganic material like aluminum and the calibration material is aluminum.

In one aspect, when the $Z_{eff}$ value of a pixel is converted to the $Z_{eff\text{-}threshold}$, the correction factor applied to the attenuation value of the pixel is based on a difference between the $Z_{eff}$ at the pixel and the $Z_{eff\text{-}threshold}$. The correction factor can be obtained from a look-up table storing attenuation values and $Z_{eff}$ values for various material overlaps. The corrected attenuation value of a pixel is used to identify the maximum amount of the material that maybe present at the pixel.

In another aspect, there is provided a system for detecting the presence of a material in an object. The system includes an x-ray scanning device for obtaining raw x-ray image data, the raw x-ray image data comprising a plurality of pixels, wherein each pixel of the plurality of pixels has associated therewith an attenuation value and an effective atomic number ($Z_{eff}$) for the pixel. The system further includes at least one processor configured to convert, for each pixel having a $Z_{eff}$ value greater than a threshold effective atomic number ($Z_{eff\text{-}threshold}$), the $Z_{eff}$ at the pixel to the $Z_{eff\text{-}threshold}$ while applying a correction factor to the attenuation value for the pixel to bring the attenuation value into correspondence with the conversion of the $Z_{eff}$ value for the pixel, and determine a maximum potential amount of the material that is present at each pixel based on the corrected attenuation value at the pixel.

The processor may be further configured to generate an image showing the maximum amount of the material that is present at each pixel of the image. In a further aspect, the processor is further configured to provide the image to a display. This visual display of the image makes the presence of the material more apparent and therefore makes it easier to identify potential threats.

In another aspect, there is provided a method for enhancing a display of raw x-ray image data of an object to identify if a region of the object contains organic material. The method includes obtaining the raw x-ray image data of the object, wherein the raw image data comprises a plurality of pixels, and wherein each pixel of the plurality of pixels has associated therewith an attenuation value and an effective atomic number ($Z_{eff}$), converting, for each pixel having a $Z_{eff}$ value greater than a threshold effective atomic number for the organic material ($Z_{eff\text{-}threshold}$), the $Z_{eff}$ at the pixel to the $Z_{eff\text{-}threshold}$ while applying a correction factor to the attenuation value for the pixel to bring the attenuation value into correspondence with the conversion of the $Z_{eff}$ value for the pixel, and displaying an image of the object showing a maximum potential amount of the organic material present at each pixel based on the corrected attenuation value of the pixel.

BRIEF DESCRIPTION OF THE DRAWINGS

Exemplary non-limiting embodiments are described with reference to the accompanying drawings in which.

DETAILED DESCRIPTION

The present disclosure generally relates to a system and method for material detection in x-ray security screening. More particularly, the present disclosure relates to a system and method for detecting the presence of organic materials, such as explosives, in an x-ray security screening.

Figure 1:
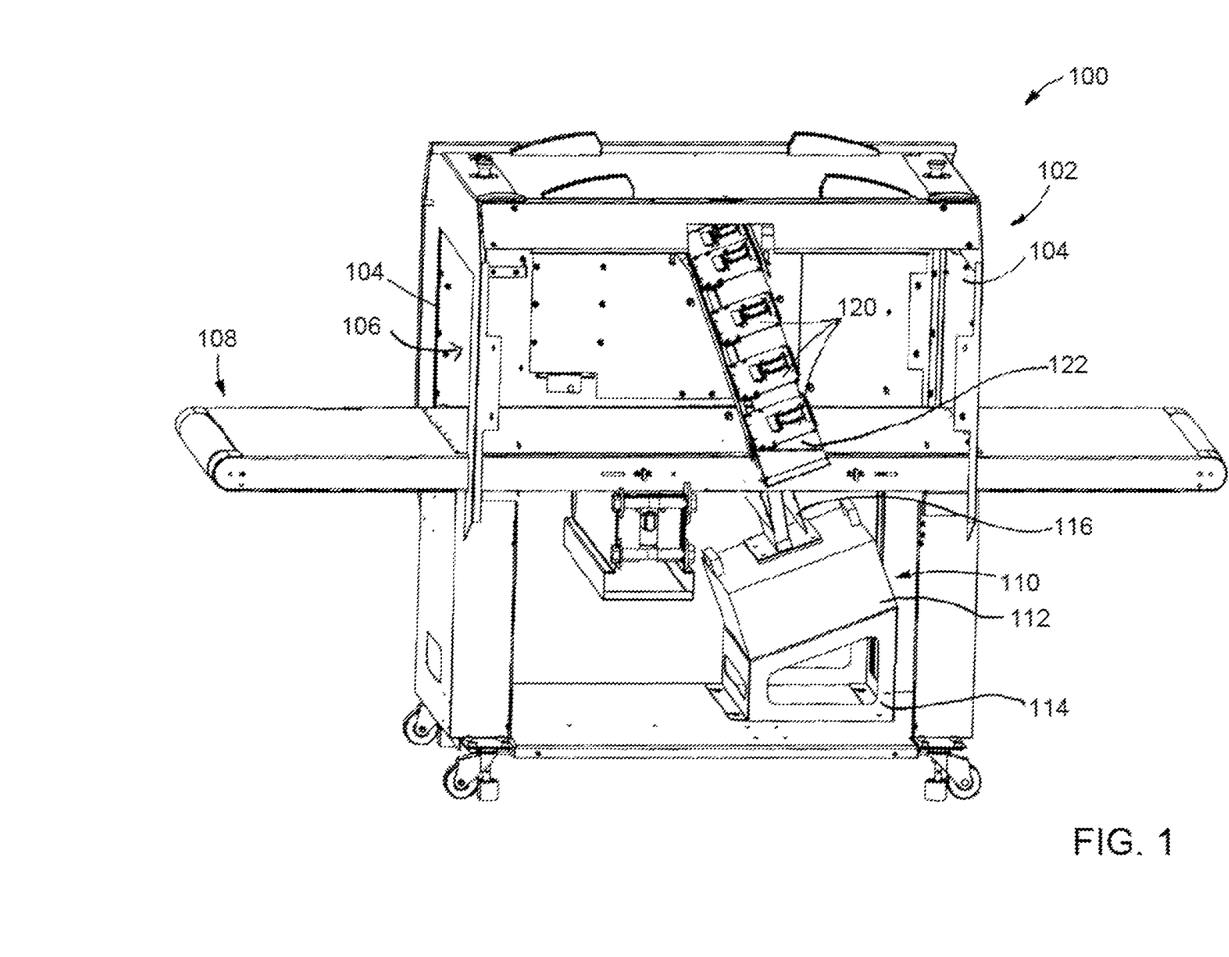
FIG. 1 is an illustration of an exemplary x-ray scanning device which may be used in accordance with the invention.

According to the aspect shown in FIG. 1, there is provided an exemplary x-ray scanning device 100. The x-ray scanning device 100 includes a housing 102 having openings 104 at either end thereof. The openings 104 provide access to a scanning chamber 106 passing through the housing 102. The system 100 may further include a displacement assembly 108, such as a conveyor, which extends through the scanning chamber 106 and which may be used to displace at least one object of interest to be scanned using the x-ray scanning device 100. The x-ray scanning device 100 further includes a source assembly 110. The source assembly 110 includes a source (not shown) for emitting electromagnetic radiation such as x-rays, a source assembly housing 112 at least partially enclosing the source, a pedestal 114 to which the source assembly housing 112 is mounted and a collimator 116 mounted to the source assembly housing 112 for directing x-rays emitted from the source. Collimator 116 may for example be a fan-shaped collimator for directing the x-rays in a fan-shaped beam. However, collimator 116 may be of any suitable shape and not only fan-shaped.

The x-ray scanning device 100 may further include a group of detectors including at least one detector 120 and preferably a plurality of detectors 120 each mounted to the bracket 122. In one aspect, the bracket is an L-shaped bracket which is positioned within the scanning chamber 106 such that the plurality of detectors 120 are mounted at least partially about the scanning chamber 106. In the aspect shown in FIG. 1 there is shown mounted within the scanning chamber a single bracket 122. In other aspects, the scanning chamber may include more than one bracket positioned within the scanning chamber and that the brackets do not have to have same orientation or angular position. It should be further understood that the bracket 122 does not have to be L-shaped. Rather, the bracket 122 may be linear or arc shaped or any other suitable shape.

In some embodiments, each detector 120 includes a detector card having a center point and edges. The center point corresponds to the geometric center of the detector cards. The edges of each detector card define the boundaries of the detector 120.

Figure 2:
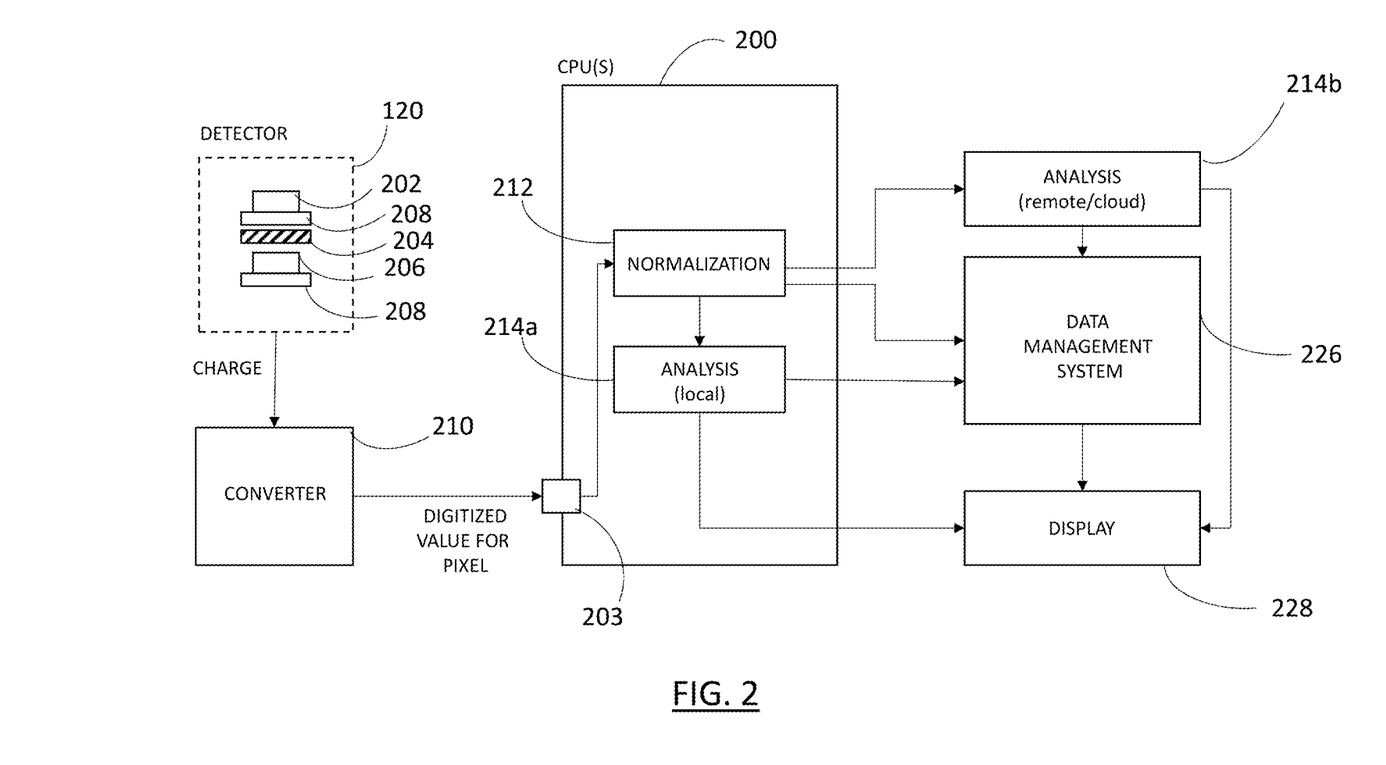
FIG. 2 is a diagram representation of a system which may be used in one aspect of the invention.

As shown in FIG. 2, each detector 120 may comprise a first scintillator 202, a filter 204 and a second scintillator 206. All of these may be sandwiched together as shown in FIG. 2 or may be otherwise suitably arranged. In a scanning operation, broad-spectrum x-rays are emitted by the source and are directed by the collimator 116 toward the plurality of detectors 120 within the scanning chamber 106. In the case of each detector 120, a plurality of the emitted x-rays encounters the first scintillator 202 which may be configured to detect the lower portion of the emitted x-ray signal spectrum. Residual low energy x-ray signals may then be stopped by the filter 204 and remaining x-ray signals from the emitted x-rays reach the second scintillator 206 which may be configured to detect a higher portion of the x-ray signal spectrum.

With further reference to FIG. 2, in one aspect, each of the scintillators 202, 206 converts the detected x-ray energy to light. Each of these scintillators 202, 206 is coupled with a photodiode 208 which captures the light from the respective scintillator 202, 206 and generates a corresponding analog electric signal, such as a photo current signal. The electric signal is further digitized by a converter 210. The digitized signal value is associated with a pixel of an image for providing a visual representation of a portion of an object within the scanning volume being scanned. The detectors thus measure to what degree the x-ray signal has attenuated due to passing through a defined inspection volume.

In the conversion of the light into an electric signal by the photodiodes 208, some uncertainties may be introduced in that a given light source may result in different electric signals since every detector card reacts slightly differently to the presence or absence of the electromagnetic radiation of an x-ray. In order to correct these variations and for the final image to appear more homogenously, each pixel of the image may be normalized by correcting an offset and gain in the light conversion. Such a normalization procedure may be executed for example using a normalization module 212 as shown in FIG. 2 in order to compensate for slight variations in offset and gain for each detector, as well as for estimating the expected uncertainties in the low-energy and high-energy signals and/or attenuation for each detector.

Detectors 120 and the x-ray scanning device 100 may be linked to one or more local central processing units (CPU) 200 or other local processing device coupled with the x-ray scanning device 100 via a suitable communication means such as input port 203. Thereby, x-ray signals detected by the detectors 120 may be analyzed locally using, for example, analysis module 214a. The information output from the analysis module 214a may be output locally. Such output may include output of an image to a display 228 for review by security personnel or to a suitable data storage volume, database or preferably data management system 226. Alternatively, the CPU may be configured to provide the x-ray scanning data to a remote location or cloud system for remote analysis 214b, via a suitable communication means, such as a network connection, for processing and may be further configured to receive from the remote location 214b the processed information sent back to the x-ray scanning device or a computer or monitor operably coupled therewith.

The detected x-ray energy signals resulting from the steps described above, once digitized, provide one or more raw x-ray image data sets which can be displayed in graphical form and can be recognized by a human technician as indicating the presence of particular structures representing a specific class of objects or materials in the object.

In another aspect, the x-ray scanning device 100 may include a cadmium zinc telluride (CZT) detector. CZT detectors are designed with a thin layer of metal deposited on the detector surfaces to act as electrodes. These electrodes allow the CZT detectors to be electrically biased to creating an electrical potential across the detector. CZT detectors can directly convert x-rays into electrons and provide high detection efficiency and the capability of multi-energy imaging.

Figure 3:
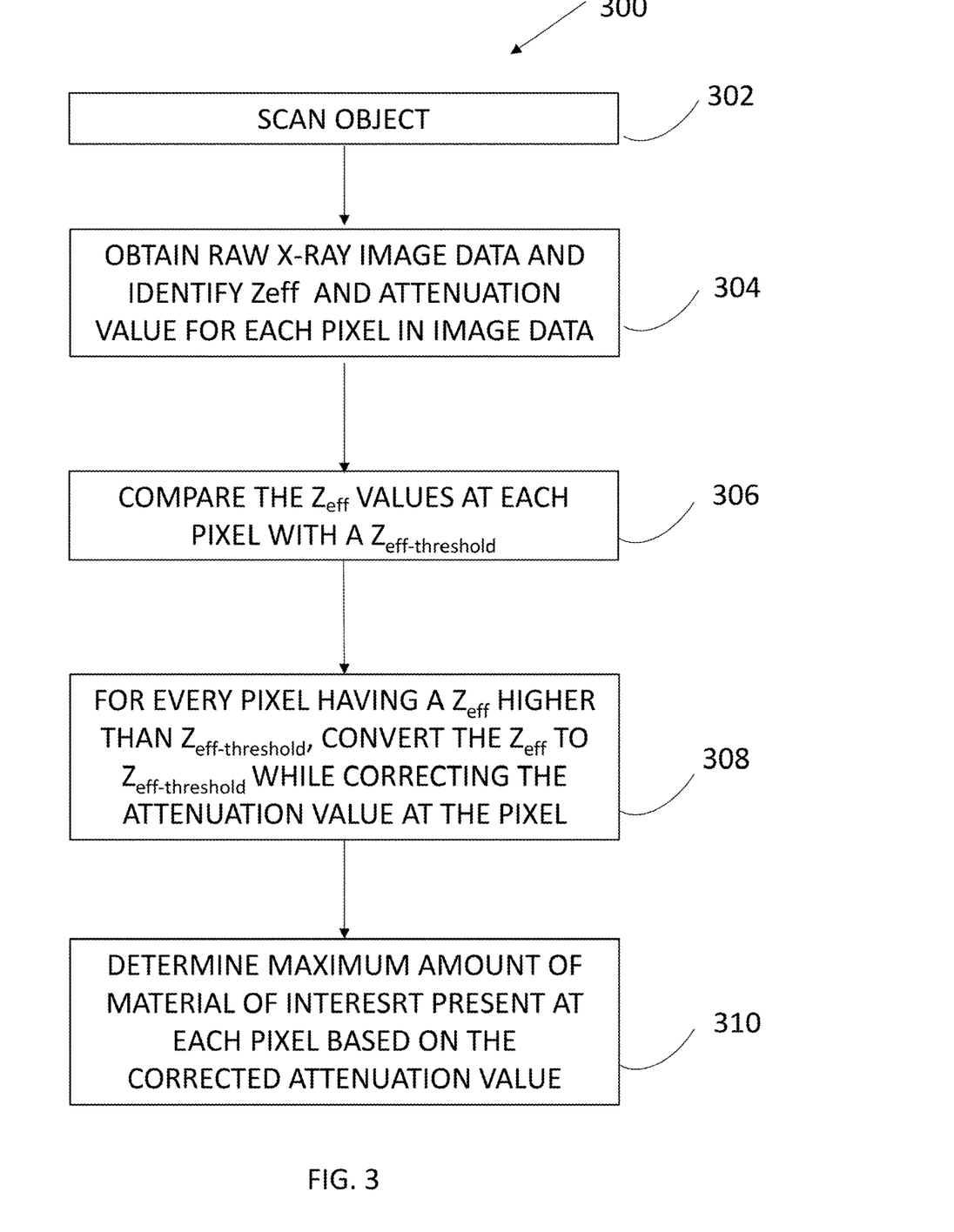
FIG. 3 is a flow chart illustrating a material detection process according to one aspect of the invention.

FIG. 3 is a flowchart summarizing the operational process 300 of one aspect of the invention. In a first step 302, an object is scanned using an x-ray scanning device. In one aspect, the object may be scanned using the x-ray scanning device 100 described above with reference to FIG. 1. At step 304, raw x-ray image data, is generated from scanning the object. In one aspect, the raw x-ray data images may be produced by performing an x-ray scanning operation on an object using an x-ray scanning device, for example, in the manner described above with reference to FIG. 1 and FIG. 2.

The raw x-ray image data sets are made up of a plurality of pixels. Each pixel in the plurality of pixels has associated therewith an attenuation value and an effective atomic number ($Z_{eff}$) value. The attenuation value of a pixel, among other factors, represents the reduction in intensity of an x-ray beam as it traverses the matter present in the object being scanned. The attenuation value can vary depending on the type and thickness of the matter through which the x-ray beam passes. The $Z_{eff}$ value associated with a pixel represents the effective atomic number of the various materials composing the object through which the x-ray beam passes. $Z_{eff}$ values vary for different types of materials. For instance, organic materials like food, clothing, explosives and other toxic materials have lower $Z_{eff}$ values while inorganic materials like metals have higher $Z_{eff}$ values. The attenuation values and $Z_{eff}$ values associated with each pixel are identified at step 304.

At step 306, the $Z_{eff}$ values associated with each pixel in the raw data image is compared with a threshold effective atomic number for a material of interest ($Z_{eff\text{-}threshold}$). The threshold effective atomic number can be predetermined prior to method 300 or determined as a precursor to step 306.

For every pixel having a $Z_{eff}$ value lower than the $Z_{eff\text{-}threshold}$ value, the attenuation value of the pixel is representative of the potential maximum amount of the material of interest present in that region of the object. Since the attenuation value of the pixel is already representative of the potential maximum amount of the material of interest present in that region of the object, no transformation or correction is required at that pixel.

For every image pixel having a $Z_{eff}$ value greater than the $Z_{eff\text{-}threshold}$ value, the attenuation value of the pixel may represent contribution from the x-ray passing through different types of materials. It would be advantageous to convert the signal at pixels having a $Z_{eff}$ value greater than the $Z_{eff\text{-}threshold}$ value, to show the potential contribution from the x-ray passing through only a material of interest. This would allow for an improved detection of the material of interest in an object.

At step 308, to identify the maximum potential contribution to the signal from only the material of interest, for every image pixel having a $Z_{eff}$ value greater than the $Z_{eff\text{-}threshold}$ value, the $Z_{eff}$ value is converted to the $Z_{eff\text{-}threshold}$ while simultaneously applying a correction factor to correct the attenuation value of the pixel. The attenuation value is corrected based on a difference between $Z_{eff}$ and $Z_{eff\text{-}threshold}$ ($\Delta Z_{eff}$). The correction factor to be applied is a function of attenuation and $Z_{eff}$ of the overlapping materials. The correction factor for different material overlaps may be predetermined and stored for retrieval during the operation described herein. Such storage may, for example, take the form of one or more lookup tables created through repeated scanning of reference materials. The reference materials may include various combinations of organic and inorganic materials, organic materials only or inorganic materials only. In one instance, the reference materials used include plexiglass, aluminum, and steel. Preferably, the lookup tables store attenuation values and effective atomic number values for a wide variety of organic material and inorganic material overlaps. Thereby, the x-ray signal information for a variety of organic and inorganic material overlaps may be easily retrieved during an image raw data processing or enhancement operation.

At step 310, the corrected attenuation value for each pixel is used to determine the potential maximum amount or thickness of the material of interest that is present at each pixel. In a preferred aspect, an image may then be generated representing the potential maximum amount of the material of interest that is present at each pixel. If no material of interest is present in a given region of the object, then the corresponding image pixel will be blank. If the material of interest is present in a given region of the object, the potential maximum amount, or thickness, of the material of interest can be determined from the corrected attenuation value of the pixel. For a region of the object having a higher amount of the material of interest, the corresponding pixel may be darker or more intensely colored as compared to a pixel for a region of the object having a lower amount of the material of interest. Displaying this information as an image allows a human operator to make a visual assessment as to which areas of an image, and hence a scanned object, may have a higher likelihood of containing the material of interest.

In a preferred embodiment, the material of interest is an organic material. The $Z_{eff\text{-}threshold}$ value for organic materials may be set using an organic material having a low $Z_{eff}$ value as a calibration material. In a preferred aspect, for detection of the presence of organic materials, plexiglass may be used as the calibration material to determine the $Z_{eff\text{-}threshold}$ value. The look-up tables may be created using plexiglass as a calibration material in combination with an inorganic material such as steel as the reference material. To identify the maximum potential contribution to the signal from only organic materials, for every image pixel having a $Z_{eff}$ value greater than the $Z_{eff\text{-}threshold}$ value, the $Z_{eff}$ value is converted to the $Z_{eff\text{-}threshold}$ while simultaneously applying a correction factor to correct the attenuation value of the pixel. When the correction factor is applied to the attenuation value for each pixel, the signal contribution from the inorganic material is removed and the corrected attenuation value represents the signal contribution from the organic material alone. In a physical sense, the signal contribution of the organic material at each pixel represents the maximum potential amount of organic material that may be present at that location in the scanned object. It should be noted that the corrected attenuation value determines the maximum amount of organic material that may be present at each pixel and not the actual amount of organic material present, which may be lower.

In another embodiment, the material of interest may be an inorganic material such as aluminum. The $Z_{\textit{eff-threshold}}$ value for detecting the presence of aluminum can be set using aluminum as a calibration material. The look-up tables may be created using aluminum as a calibration material in combination with an inorganic material such as steel as the reference material. To identify the maximum potential contribution to the signal from aluminum, for every image pixel having a $Z_{\textit{eff}}$ value greater than the $Z_{\textit{eff-threshold}}$ value, the $Z_{\textit{eff}}$ value is converted to the $Z_{\textit{eff-threshold}}$ while simultaneously applying a correction factor to correct the attenuation value of the pixel. When the correction factor is applied to the attenuation value for each pixel, the corrected attenuation value represents the signal contribution from aluminum alone. In a physical sense, the signal contribution from aluminum at each pixel represents the maximum potential amount of aluminum that may be present at that location in the scanned object. It should be noted that the corrected attenuation value determines the maximum amount of aluminum that may be present at each pixel and not the actual amount of aluminum present, which may be lower.

In a preferred aspect, an image may then be generated representing the potential maximum amount of the material of interest that is present at each pixel. If no material of interest is present in a given region of the object, then the corresponding image pixel will be blank. If the material of interest is present in a given region of the object, the potential maximum amount, or thickness, of the material of interest can be determined from the corrected attenuation value of the pixel. For a region of the object having a higher amount of the material of interest, the corresponding pixel may be darker or more intensely colored as compared to a pixel for a region of the object having a lower amount of the material of interest. Displaying this information as an image allows a human operator to make a visual assessment as to which areas of an image, and hence a scanned object, may have a higher likelihood of containing the material of interest. In a still preferred aspect, the material of interest is an organic material and displaying an image showing the maximum potential amount of organic material that may be present at each pixel visually illustrates the areas in an object where an organic material may be present. Thereby, the operator can focus on specific areas of an image pixel or region which are more likely to potentially conceal a threat, for example, an explosive material.

Figure 4A:
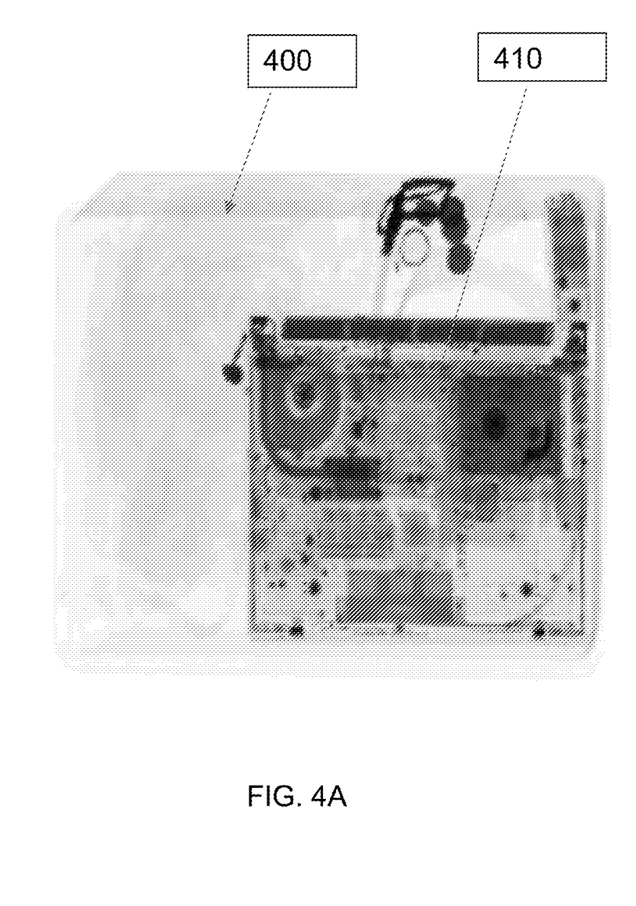
FIG. 4A is top view of an original x-ray image generated in accordance with one aspect of the invention; and, FIG. 4B is top view of a modified x-ray image generated in accordance with one aspect of the invention.

FIG. 4A depicts a top view of an x-ray image generated as described above with reference to FIGS. 1 and 2. An object is passed though the x-ray scanning device 100 of FIG. 1 to generate an image 400 of the object. FIG. 4A illustrates a cluttered region 410 of the image that makes detection of potential threats difficult as the organic material cannot be clearly distinguished from the other materials that superimpose or underlay the organic material.

Figure 4B:
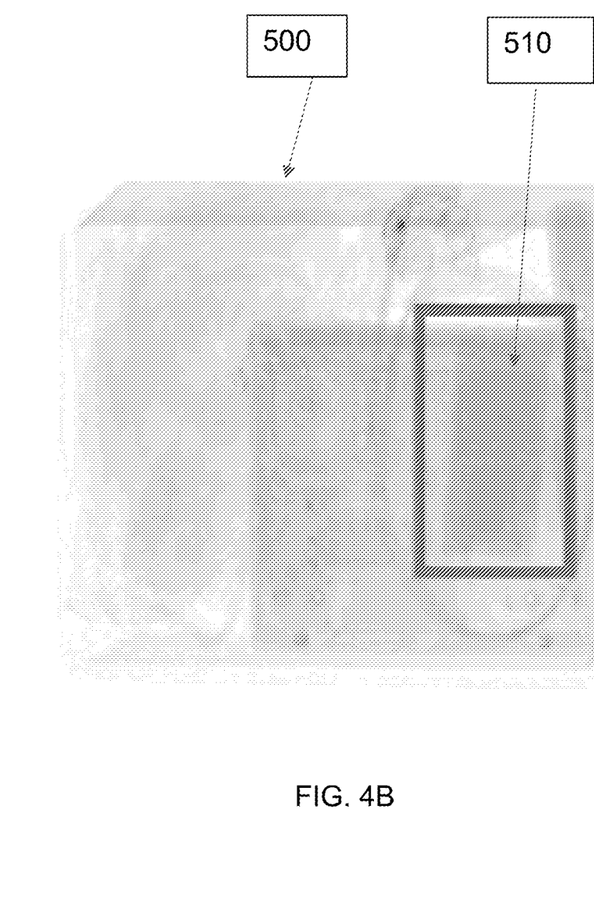

FIG. 4B depicts a top view of a modified x-ray image 500 of an object of interest obtained from the process 300 as described above with regard to FIG. 3. FIG. 4B illustrates that maximum amount of the organic material that may be present in each region of the image 500 of the object of interest. If a pixel is blank, then no organic material is present. If organic material is present, the potential maximum amount (thickness) can be determined from the corrected attenuation value. In one example, region 510 in FIG. 4B depicts a region with a greater amount of organic material that may be present as compared to the rest of the image. Presenting this additional image information to operators of x-ray scanning devices can greatly help them in identifying potential threat regions in an object. In another aspect, this image information can also be directly used by an automated threat detection algorithm with an image processing functionality that can highlight these regions for operator review.

While the invention has been described in terms of specific embodiments, it is apparent that other forms could be adopted by one skilled in the art. For example, the methods described herein could be performed in a manner which differs from the embodiments described herein. The steps of each method could be performed using similar steps or steps producing the same result, but which are not necessarily equivalent to the steps described herein. Some steps may also be performed in different order to obtain the same result. Similarly, the apparatuses and systems described herein could differ in appearance and construction from the embodiments described herein, the functions of each component of the apparatus could be performed by components of different construction but capable of a similar though not necessarily equivalent function, and appropriate materials could be substituted for those noted. Accordingly, it should be understood that the invention is not limited to the specific embodiments described herein. It should also be understood that the phraseology and terminology employed above are for the purpose of disclosing the illustrated embodiments, and do not necessarily serve as limitations to the scope of the invention.

What is claimed is:

1. A method for detecting a presence of a material in an object, the method comprising:
    obtaining X-ray image data of the object, wherein the X-ray image data comprises a plurality of pixels and wherein each pixel of the plurality of pixels has associated therewith an attenuation value and an effective atomic number ($Z_{\textit{eff}}$) value;
    for each pixel having said $Z_{\textit{eff}}$ value greater than a threshold effective atomic number ($Z_{\textit{eff}}$-threshold), converting the $Z_{\textit{eff}}$ value associated with the pixel to the $Z_{\textit{eff}}$-threshold, wherein the $Z_{\textit{eff}}$-threshold is representative of a target material;
    for each pixel having said $Z_{\textit{eff}}$ value less than a threshold effective atomic number ($Z_{\textit{eff}}$-threshold), not changing the $Z_{\textit{eff}}$ value;
    determining a maximum potential amount of the material present at each pixel based on at least one of the unchanged $Z_{\textit{eff}}$ value and the converted $Z_{\textit{eff}}$ value; and
    displaying an image of the object showing a maximum potential amount of the target material present at each pixel based on at least one of the unchanged $Z_{\textit{eff}}$ value and the converted $Z_{\textit{eff}}$ value.

2. The method of claim 1, further comprising, for each pixel having said $Z_{\textit{eff}}$ value greater than said threshold effective atomic number ($Z_{\textit{eff}}$-threshold), applying a correction factor to the attenuation value associated with the pixel to generate a corrected attenuation value.

3. The method of claim 2, wherein the correction factor is based on a difference between the $Z_{\textit{eff}}$ at the pixel and the $Z_{\textit{eff}}$-threshold.

4. The method of claim 2, further comprising obtaining the correction factor from a table comprising attenuation values and $Z_{\textit{eff}}$ values for various material overlaps.

5. The method of claim 4, wherein said various material overlaps comprise different combinations of overlapping organic and inorganic materials.

6. The method of claim 1, further comprising acquiring the $Z_{eff}$-threshold from a database, wherein the database comprises a plurality of values representative of $Z_{eff}$-thresholds associated with different ones of said target material.

7. The method of claim 1, wherein the target material is at least one of an organic material, an inorganic material, and aluminum.

8. The method of claim 1, further comprising normalizing each pixel by correcting a detector offset value.

9. The method of claim 1, further comprising normalizing each pixel by correcting a detector gain value.

10. The method of claim 1, wherein pixels with a lower amount of the target material are lighter or less intensely colored than pixels with a higher amount of the target material.

11. A system for detecting a presence of a material in an object, the system comprising:
an x-ray scanning device for obtaining X-ray image data of the object, wherein the X-ray image data comprises a plurality of pixels and wherein each pixel of the plurality of pixels has associated therewith an attenuation value and an effective atomic number ($Z_{eff}$) value; and
at least one processor configured to:
convert, for each pixel having said $Z_{eff}$ value greater than a threshold effective atomic number ($Z_{eff}$-threshold), the $Z_{eff}$ value associated with the pixel to the $Z_{eff}$-threshold, wherein the $Z_{eff}$-threshold is representative of a target material;
not change the $Z_{eff}$ value for each pixel having said $Z_{eff}$ value less than a threshold effective atomic number ($Z_{eff}$-threshold);
determine a maximum potential amount of the material present at each pixel based on at least one of the unchanged $Z_{eff}$ value and the converted $Z_{eff}$ value; and
display an image of the object showing a maximum potential amount of the target material present at each pixel based on at least one of the unchanged $Z_{eff}$ value and the converted $Z_{eff}$ value.

12. The system of claim 11 wherein the at least one processor is further configured to apply a correction factor to the attenuation value associated with the pixel to generate a corrected attenuation value for each pixel having said $Z_{eff}$ value greater than said threshold effective atomic number ($Z_{eff}$-threshold).

13. The system of claim 12, wherein the correction factor is based on a difference between the $Z_{eff}$ at the pixel and the $Z_{eff}$-threshold.

14. The system of claim 12, wherein the at least one processor is further configured to obtain the correction factor from a table comprising attenuation values and $Z_{eff}$ values for various material overlaps.

15. The system of claim 14, wherein said various material overlaps comprise different combinations of overlapping organic and inorganic materials.

16. The system of claim 11, wherein the processor is further configured to acquire the $Z_{eff}$-threshold from a database, wherein the database comprises a plurality of values representative of $Z_{eff}$-thresholds associated with different ones of said target material.

17. The system of claim 11, wherein the target material is at least one of an organic material, an inorganic material, and aluminum.

18. The system of claim 11, wherein the processor is further configured to normalize each pixel by correcting a detector offset value.

19. The system of claim 11, wherein the processor is further configured to normalize each pixel by correcting a detector gain value.

20. The system of claim 11, wherein pixels with a lower amount of the target material are lighter or less intensely colored than pixels with a higher amount of the target material.

* * * * *